United States Patent [19]

Kobayashi et al.

[11] 4,048,136

[45] Sept. 13, 1977

[54] METALLIC TONE POWDER COATING COMPOSITION

[75] Inventors: Sadao Kobayashi; Hiroshi Ozawa; Nobuki Kobayashi, all of Yokohama, Japan

[73] Assignee: Mitsui Toatsu Kagaku Kabushiki Kaisha (Mitsui Toatsu Chem., Inc.), Tokyo, Japan

[21] Appl. No.: 621,518

[22] Filed: Oct. 10, 1975

Related U.S. Application Data

[63] Continuation of Ser. No. 485,637, July 3, 1974, abandoned.

[30] Foreign Application Priority Data

July 7, 1973    Japan .................................. 48-76784

[51] Int. Cl.$^2$ ............................. C08K 9/04; C08K 9/10
[52] U.S. Cl. ............................... 260/42.14; 260/42.15; 260/42.16; 260/42.53
[58] Field of Search ............... 260/42.14, 42.15, 42.53, 260/42.16

[56] References Cited

U.S. PATENT DOCUMENTS

| | | | |
|---|---|---|---|
| 2,876,133 | 3/1959 | Iler et al. | 260/42.14 |
| 3,519,591 | 7/1970 | Bolger | 260/42.53 |
| 3,532,662 | 10/1970 | Ansdell | 260/34.2 |
| 3,544,500 | 12/1970 | Osmond et al. | 260/42.14 |
| 3,575,900 | 4/1971 | Ponyik | 260/836 |
| 3,730,930 | 5/1973 | Labana | 260/836 |
| 3,781,379 | 12/1973 | Theodore et al. | 260/836 |

*Primary Examiner*—James H. Derrington
*Attorney, Agent, or Firm*—William J. Daniel

[57] ABSTRACT

A metallic tone powder coating composition of acrylic resin series which comprises a polymer-capsulated metal powder composite material wherein a vinyl monomer is chemically combined with a powder of a metal such as aluminum and a copolymer having a glass transition temperature of at least 20° C wherein the sum of an acrylic ester and a methacrylic ester is at least 30% by weight of the total monomer constituting the copolymer. This powder coating composition provides a coating film having excellent weather-resistance and beautiful appearance and is suited for use in electrostatic powder spraying.

8 Claims, No Drawings

METALLIC TONE POWDER COATING COMPOSITION

This is a continuation of Ser. No. 485,637, filed July 3, 1974, now abandoned.

BACKGROUND OF THE INVENTION

This invention relates to a new metallic tone powder coating composition of acrylic resin series which provides a coating film having excellent weather-resistance and beautiful appearance and is suited for use in electrostatic powder spraying.

Solvent-containing paints have widely been used heretofore for coating metal or other kinds of materials. With a view of avoiding air pollution caused by solvents in the paints, however, a variety of powder paints are being developed recently.

Among various powder paints, acrylic powder paints are excellent in weather-resistance and hence are suitable for coating cars and electric instruments. In such applications, a fine coating appearance having a metallic tone is frequently required.

In order to obtain a paint film having a metallic appearance, a metallic tone paint is prepared and used in which a powder of such metal as aluminum, brass or bronze has been suspended, even in the case of a powder paint, into a solution of a resin. In the case of such powder paint where no solvent is present, the surface of the metal powder is not coated with a resin by merely blending the metal powder with the resin powder. When such metallic tone paints were applied according to the electrostatic coating method which is the most convenient for practical application of powder paints, it was found extremely difficult to perform the coating operation practically for the reason that the metal powder and the resin powder are quite different in electrostatic characteristics. In addition, there is a high possibility of dust explosion due to static electricity and the metal powder may be oxidized by the action of a high electric voltage employed during the electrostatic coating operation, whereby the metallic tone may also be changed.

On the other hand, a metallic tone powder paint produced by mixing a metal powder with a resin in molten state to coat the surface of the metal powder with the resin and thereafter, finely pulverizing the mixture after cooling has drawbacks in that it fails to provide a paint film with a desired metallic tone appearance as the form and structure of the metal powder are altered during the pulverizing operation and that there is a great possibility of dust explosion in the course of the pulverizing operation.

As the result of much research carried out for the purpose of developing a metallic tone powder coating composition of acrylic series which is improved in the above-mentioned problems seen in the conventional metallic tone powder paints, it has now been found that such purpose can be attained and the afore-mentioned drawbacks can be overcome by a composition comprised of a specific copolymer and a polymer-capsulated metal powder composite material prepared by chemically combining the metal powder with a synthetic resin according to a specific treatment. This invention has been accomplished on the basis of the above finding.

BRIEF SUMMARY OF THE INVENTION

An object of this invention is to provide a powder coating composition of acrylic resin series which is excellent in weather-resistance and suitable for use in electrostatic powder spraying and provides a coating film having a beautiful appearance.

Another object of this invention is to provide a powder coating composition of acrylic resin series which is suitable for use in electrostatic powder spraying and provides a film having excellent characteristics, the composition being prepared by merely blending the copolymer in powdery form with the polymer-capsulated metal powder composite material.

DETAILED DESCRIPTION OF THE INVENTION

In accordance with this invention, there is provided a metallic tone powder coating composition of acrylic resin series which comprises A. a polymer-capsulated metal powder composite material wherein at least one vinyl polymer is chemically combined with a metal powder, and B. a solid copolymer having a glass transition point of at least 20° C wherein the sum of an acrylic ester and a methacrylic ester is at least 30% by weight of the total monomers constituting said copolymer.

In this invention, the polymer-capsulated metal powder composite material (A) wherein the polymer is chemically combined with the metal powder is a substance wherein not only is the surface of the individual metal powder physically coated with the polymer, but the metal and the polymer are combined with each other by a certain chemical bond. Accordingly, the polymer cannot be separated from the metal powder even in the case of extracting the composite material under heating with a solvent which can dissolve the polymer.

The polymer-capsulated metal powder composite material is prepared by subjecting the surface of the metal powder to an acid treatment, activating the surface by neutralization with an alkali, adding a vinylic monomer to the metal powder with the activated surface and then subjecting the mixture to a polymerization reaction.

The acid used for this purpose may be a mineral acid such as sulfuric acid, phosphoric acid, hydrochloric acid or nitric acid or an organic acid such as acetic acid, stearic acid, oleic acid, terephthalic acid or orthophthalic acid.

Typical examples of the alkali used for this purpose include caustic soda, caustic potash and ammonia water. In case the acid treatment is carried out with phosphoric acid, the activation treatment can be effected without using such alkaline reagent.

The polymerization reaction is carried out by dispersing the metal powder into water and/or an organic solvent. In this case, a conventional organic peroxide or azo compound can be used as a radical polymerization initiator. The use of a water-soluble organic peroxide such as tert-butyl permaleate or succinic acid peroxide or a water-soluble azo compound such as 2,2'-azo-bis(2-amidinopropane) hydrochloride yields a particularly desirable capsulated metal powder. Hydrogen peroxide, cumene hydroperoxide and a combination of hydrogen peroxide and l-ascorbic acid are also effective radical initiators.

If the surface activation treatment for the metal powder with an acid and an alkali is not performed, it is an effective method to disperse the metal powder into water and/or a solvent, adding a vinylic monomer to the dispersion and then allowing the polymerization reaction to proceed in the presence of at least one kind of the compounds capable of producing bisulfite ion or persulfate compounds.

The aforementioned vinylic monomer is a compound which has a vinyl band in the molecule and is capable of radical polymerization or copolymerization. Illustrative of such vinylic monomers are styrene, alpha-methylstyrene, vinyltoluene, acrylonitrile, methacrylonitrile, vinyl acetate, vinyl propionate, etc. For the uses where weather-resistance is required, however, acrylic acid, acrylic esters, methacrylic acid and methacrylic esters are desirable. More specific examples of the acrylic esters include methyl acrylate, ethyl acrylate, n-butyl acrylate, 2-ethylhexyl acrylate, lauryl acrylate, stearyl acrylate, hydroxyethyl acrylate, phosphates of hydroxyethyl acrylate, hydroxypropyl acrylate, methoxyethyl acrylate, butoxyethyl acrylate, cyclohexyl acrylate and glycidyl acrylate. Illustrative of the methacrylic esters are methyl methacrylate, ethyl methacrylate, isobutyl methacrylate, n-butyl methacrylate, tert-butyl methacrylate, 2-ethylhexyl methacrylate, lauryl methacrylate, stearyl methacrylate, oleyl methacrylate, methoxyethyl methacrylate, ethoxyethyl methacrylate, butoxyethyl methacrylate, hydroxyethyl methacrylate, phosphates of hydroxyethyl methacrylate, hydropropyl methacrylate, cyclohexyl methacrylate, glycidyl methacrylate, beta-methylglycidyl methacrylate, diethylaminoethyl methacrylate and gamma-methacryloxypropyl trimethoxysilane. These acrylic acid and esters thereof as well as methacrylic acid and esters thereof may be used in combination with the other type of vinylic monomers afore-mentioned.

Examples of the material for the metal powder include aluminum, brass, bronze, stainless steel and copper, with aluminum being most preferable.

In the composite material of the polymer and the metal used in this invention, the polymer and the metal do not merely adhere to each other physically but are bound by a certain chemical bond. This fact can be confirmed by the method as will be stated just hereunder.

A polymer derived from the vinylic polymer used for the preparation of the composite material and contained therein is extracted in a Soxhlet extractor with a solvent which can dissolve the polymer. A liquid which does not dissolve the polymer but is miscible with the solvent is then added to the extract. If there is found any precipitate, it will be a so-called free polymer not combined with the metal powder, which is then collected by filtration and dried to know its weight. On the other hand, the extraction residue containing the metal powder is dried, placed on a thermobalance and the decrease in weight on heating at temperatures from normal temperature to 500° C in a nitrogen stream is measured. If the polymer is combined chemically with the metal powder, the extraction residue will exhibit a decrease in weight at temperatures of 200°–500° C between which the polymer is thermally decomposed.

The proportion of the polymer combined with the metal powder can be varied according to the conditions for preparing the composite material, especially the amount of the vinylic monomer used. In the composite material used in this invention wherein the polymer and the metal powder are combined chemically, the quantity of the combined polymer is preferably between 0.2 parts by weight and 20 parts by weight, inclusive, per 100 parts by weight of the metal powder. It is desirable that the amount of the free polymer is as small as possible.

The shape of the metal powder used in the composite material may be any of scaly, fibrous, rod-like, acicular, granular and spherical structures and can suitably be selected therefrom according to the desired metallic tone appearance of the coating film.

In the polymer-capsulated metal powder composite material thus obtained, the polymer is chemically combined with the metal and thus form a strong coating film covering evenly the surface of the metal powder. Accordingly, the composite material gives a metallic tone powder paint which shows high safety when used for the electrostatic spraying operation and forms a coating film with high stability and excellent weather resistance. In the coating operation, the powder paint remains unadhered and can be used again without difficulty.

The solid copolymer used for the powder paint recited in (B) is obtained by using an acrylic or methacrylic ester in an amount of at least 30% by weight of the total copolymerizable monomers and copolymerizing these monomers. This solid copolymer affords a coating with good weather-resistance.

Illustrative of the acrylic and methacrylic esters used for this purpose are methyl acrylate, ethyl acrylate, n-butyl acrylate, isobutyl acrylate, tert-butyl acrylate, 2-ethylhexyl acrylate, cyclohexyl acrylate, methoxyethyl acrylate, ethoxyethyl acrylate, hydroxyethyl acrylate, hydroxypropyl acrylate, glycidyl acrylate, methyl methacrylate, ethyl methacrylate, n-butyl methacrylate, isobutyl methacrylate, tert-butyl methacrylate, 2-ethylhexyl methacrylate, lauryl methacrylate, stearyl methacrylate, methoxyethylmethacrylate, ethoxyethyl methacrylate, butoxyethyl methacrylate, cyclohexyl methacrylate, hydroxyethyl methacrylate, tetrahydrofurfuryl methacrylate, glycidyl methacrylate, beta-methylglycidyl methacrylate, dimethylaminoethyl methacrylate, diethylaminoethyl methacrylate and tert-butylaminoethyl methacrylate. Examples of the monomers copolymerizable with the afore-mentioned acrylic and methacrylic esters include styrene, alpha-methalstyrene, vinyltoluene, o-chlorostyrene, p-chlorostyrene, acrylonitrile, methacrylonitrile, vinyl acetate, vinyl propionate, methacrylic acid, acrylic acid, itaconic acid, methoxymethylolacrylamide and butoxymethylolacrylamide. These monomers are copolymerized to form the solid copolymer.

The solid copolymer wherein the sum of an acrylic ester and a methacrylic ester is less than 30% by weight of the total monomers constituting the copolymer is deteriorated in weather-resistance aimed at in this invention and consequently, is unsuited for this invention. A glass transition point of the solid copolymer lower than 20° C is also inappropriate for the reason that the individual powders obtained as powder paint will be mutually fused during storage and will not maintain its powdery form. By the term "glass transition point" referred to herein, means a temperature at which the physical characteristics of the solid copolymer change from a glass region to a rubber region. In practice, the change in temperature per specific volume of the copolymer was measured by way of dilatometry, and the inflection point was determined as the glass transition point.

The solid copolymer (B) comprises a thermoplastic copolymer or a thermohardenable copolymer, depending upon the monomer used for copolymerization. This thermoplastic copolymer is not reactive during the baking process of the powder paint, while the thermohardenable copolymer undergoes, at side chains in its molecule, a crosslinking reaction and forms a crosslinked network structure during the baking process of the powder paint. The thermohardenable copolymer includes, according to the sort of crosslinkable functional groups present in the side chains, one which is self-crosslinked during the baking process and one which can form a crosslinked copolymer when a crosslinkable compound is separately added.

For example, if methoxymethylolacrylamide or butoxymethylolacrylamide is used as copolymerizable monomer, the resulting copolymer per se forms crosslinkages in the course of the baking process. On the other hand, if a monomer with a carboxyl group such as acrylic acid or methacrylic acid is copolymerized, the use of a diepoxide compound or a dioxazoline compound as a crosslinking agent will be necessary. In the case of a solid copolymer obtained by using a monomer with a hydroxy group such as hydroxyethyl acrylate, hydroxypropyl acrylate, hydroxyethyl methacrylate or hydroxypropyl methacrylate, a polyfunctional compound such as methoxymethylolmelamine or a so-called latent polyvalent isocyanate compound which produced at least two active isocyanate groups in the molecule by heating is used as crosslinking agent. In the case of a solid copolymer obtained by using a monomer with a glycidyl group such as glycidyl acrylate, glycidyl methacrylate or beta-methylglycidyl methacrylate, a dibasic acid is used as crosslinking agent.

In the composition of this invention, the composite material (A) is generally used in an amount such that its metal component is between 0.1 part by weight and 50 parts by weight, inclusive, preferably between 2.0 parts by weight and 15.0 parts by weight, inclusive, per 100 parts by weight of the solid copolymer (B).

The metallic tone powder coating composition of this invention containing an acrylic resin can be put into practice, regardless of the mode of crosslinking, or in other words, irrespective of whether the solid copolymer (B) is thermoplastic or thermohardenable.

In accordance with a specific practice of this invention, the solid copolymer (B) optionally incorporated with a crosslinking agent, an additive such as a flow-controlling agent, a colorant such as a pigment, except a metal powder, or a dye is kneaded under heating in a melt kneader such as an extruder and finely pulverized after cooling so as to have an average particle diameter of 20-100μ and then admixed with the composite material (A) to prepare a metallic tone powder coating composition containing an acrylic resin.

In the resulting metallic tone powder coating composition containing an acrylic resin, the composite material (A) and a powder composed predominantly of the solid copolymer (B) possess similar electrostatic characteristics. Accordingly, there is no danger of dust explosion. If the coating composition is applied to an article according to electrostatic coating method, the aforementioned composite material and the powder particles composed predominantly of the solid copolymer will be deposited on the article in an almost equal ratio. In this case, the remaining powder paint has the same composition as that of the freshly prepared one, so that the coating operation is performed very economically. Since the shape of the metal powder remains unchanged, a coating film with the desired metallic tone appearance can be obtained.

This invention will now be explained in more detail by way of examples which are given merely for the purpose of illustration.

EXAMPLE

1. Preparation of a polymer-capsulated metal powder composite material

300 Grams of aluminum powder (manufactured by Toyo Aluminum; 1109MA) were washed with acetone and filtered. This operation was repeated 4 times and then the aluminum powder was dried. When the washed aluminum powder was placed on a thermobalance and the change in weight of the aluminum powder on heating up to 500° C was measured, decrease in weight was found to be less than 0.1%. As the original aluminum powder was found to lose its weight by 31% on heating up to 180° C, additives used in the original aluminum powder were believed to be readily removed by washing with acetone.

150 Grams of the washed aluminum powder were immersed for 2 hours in a mixture of 300 g. of methanol, 50 g. of water and 1 g. of phosphoric acid, separated by filtration and then dried. The acid-treated aluminum powder was placed in a wide mouth bottle and dispersed into a medium consisting of 600 g. of water and 50 g. of isopropanol. After addition of 22 g. of methyl methacrylate, the mixture was heated in a water bath to raise its temperature to 50° C. 3.6 Grams of an aqueous solution of hydrogen peroxide (30%) was added to the mixture and then a solution of 1.2 g. of l-ascorbic acid in 50 g. of water was added over a period of 30 minutes, while stirring the mixture with a magnetic stirrer. The reaction was continued for 2 hours thereafter. The filtration of the liquid mixture followed by drying gave 110.3 g. of a solid product.

When 20 g. of the product were extracted with methyl ethyl ketone at 81° C for 15 hours in a Soxhlet extractor, 0.58 g. (2.89%) of a polymer was extracted. When 104 mg. of the extraction residue containing aluminum powder were placed on a thermobalance in a nitrogen stream and the change in weight of the residue on heating up to 500° C was measured, no change in weight was detected at temperatures up to 300° C. At temperatures between 300° C and 500° C, however, 6.48% of the weight was lost.

When the product before extraction in the Soxhlet extractor was placed on a thermobalance, no change in weight of the product could be detected at temperatures up to 200° C, but 2.71% of the weight was lost between 200° C and 300° C and 6.65% between 300° C and 500° C. From this experiment, it was found that the component extracted in the Soxhlet extractor was the one that was lost between 200° C and 300° C on a thermobalance and that the component which was lost at temperatures higher than 300° C, was not extracted in the Soxhlet extractor.

When 25 mg. of poly(methyl methacrylate) in powder form were placed on the thermobalance, 100% of the weight was lost between 200° C and 305° C and the differential thermal analysis conducted simultaneously revealed an endothermic peak at 275° C. As a result of these experiments, it was confirmed that the product prepared in the above-mentioned manner contained a metal-polymer composite material which was not extracted which methyl ethyl ketone and which contained a polymer thermally more stable than poly(methyl methacrylate) combined with the aluminum powder.

The composite material prepared in a manner described above, will be referred to hereinafter as composite material I. Evaluation of its application to powder paints will be described later.

An experiment for combining the polymer with copper powder was carried out as follows. In a three-necked flask with 1-liter capacity, the central neck was equipped with stirring blades, one side neck was equipped with a dropping funnel and the other side neck was so devised that a thermometer could be inserted therethrough after addition of the starting materials. About two thirds of the flask were dipped into a water bath. In this flask were placed 100 g. of commercially available copper powder which passed through a sieve of 300 mesh and 400 ml of water. While rotating the stirring blades at 250 rpm., 10 g. of a mixture of vinyl monomers were added and the stirring was continued for 10 minutes. The mixture of vinyl monomers contained 50% by weight of styrene, 20% by weight of glycidyl methacrylate and 30% by weight of methyl methacrylate.

Next, the temperature of the water bath was elevated to 51° C and a thermometer was inserted into the flask. When the inner temperature reached 50° C, a solution of 2 g. of potassium persulfate in 100 g. of water was added and then a solution of 1 g. of sodium bisulfate in 50 g. of water was added dropwise from a dropping funnel over a period of 2 hours. The reaction was continued for a further 2 hours. When the reaction mixture containing copper powder was filtered and the collected solid was dried, 107.1 g. of a product were obtained. When 20 g. of the product were extracted with a solvent consisting of 50% by weight of benzene and 50% by weight of methyl ethyl ketone to 80° C for 8 hours in a Soxhlet extractor, 0.22 g. (1.1%) of the polymer was extracted. When 102.6 mg. of the extraction residue were placed on a thermobalance in a nitrogen stream, no loss of weight was detected at temperatures up to 300° C. At temperatures between 300° and 500° C, however, 5.3% of the weight was lost. This result reveals that about 80% of 7.1 g. of the produced polymer was not extracted with the solvents and so was combined with the copper polymer.

The composite material prepared in this manner will be referred to hereinafter as composite material II. Evaluation of its application to powder paints will be described later.

2. Preparation of the solid copolymer

In a four-necked flask equipped with a stirrer, a reflux condenser and a thermometer were placed starting materials listed in experiments 1 through 5 in Table 1. A radical polymerization was carried out by stirring the materials for 6 hours at 90° C to obtain solutions of respective copolymers. Next, all of the solutions of respective copolymers were poured into 5000 g. of n-hexane to precipitate the copolymers which were then dried in vacuo to obtain solid copolymers 1–5. the glass transition points of these copolymers which were determined as the inflection point of the change in temperature per specific volume as measured by way of dilatometry are also shown in Table 1.

Table 1

| Exp. No. | 1 (1) | 2 (2) | 3 (3) | 4 (4) | 5 (5) |
|---|---|---|---|---|---|
| Copolymer No. | | | | | |
| Ethyl acrylate | 200g. | | | 100g. | |
| Methoxyethyl acrylate | | 100g. | | | 100g. |
| Cyclohexyl acrylate | | | 200g. | | |
| Hydroxyethyl acrylate | | 150g. | | | |
| Methyl methacrylate | 800g. | 300g. | 200g. | | 200g. |
| Isobutyl methacrylate | | | | 500g. | 400g. |
| Lauryl methacrylate | | | | | 100g. |
| Glycidyl methacrylate | | | 200g. | | |
| Styrene | | 300g. | 400g. | 150g. | |
| Acrylonitrile | | 70g. | | | |
| Methacrylic acid | | 50g. | | 150g. | |
| Methoxymethylolacrylamide | | | | | 200g. |
| Benzoyl peroxide | 5g. | | | | 10g. |
| Azo-bis-isobutyronitrile | | 10g. | 10g. | 20g. | |
| t-Dodecylmercaptan | | 2g. | 5g. | 5g. | 10g. |
| Toluene | 500g. | 500g. | 500g. | 500g. | 500g. |
| Glass transition point of the copolymer | 62° C | 52° C | 43° C | 56° C | 36° C |

3. Preparation of the powder paint

Each of the copolymers 1–5 prepared in a manner as described in the preceding item (2) was mixed with materials for melt kneading listed in Table 2 and the mixture was fused and kneaded in a biaxial extruder. After cooling, the mixture was finely pulverized and the fractions which passed a sieve of 100 mesh were collected. A powder paint was prepared by adding to the powder either composite material I or composite material II produced in a manner as described in above item (1).

Powder paints 6 and 7 are also tabulated for the purpose of comparison. In the powder paint 6, a commercially available scaly aluminum powder "Alpaste 1109MA" (manufactured by Toyo Aluminum) was added during the melt kneading, while in the powder paint 7, "Alpaste 1109MA" was simply mixed with copolymer I.

All the values in the table are parts by weight.

4. Comparative Experiment

Polished steel panels onto which the powder paints 1–7 prepared as described in items (1), (2) and (3) had been applied by spraying by the aid of an electrostatic powder painting machine were heated at 200° C for 30 minutes to obtain test panels coated with each one of the powder paints 1–7. The results of the evaluation of characteristics of the resulting paint films are tabulated in Table 3. A minimum level of the concentration causing dust explosion was also measured for the powder paints 1–7. The powder paints which remained uncombined with the panels during the coating operation were collected and were again applied onto the panels by means of electrostatic coating. The powder paints which were not combined with the panels after repeated application were collected and their metal contents were measured and compared with those of the freshly prepared powder paints, result of which are also listed in Table 3.

Table 2

| | Example of this inventon | | | | | Comparative Examples | |
|---|---|---|---|---|---|---|---|
| | Powder paint (1) | Powder paint (2) | Powder paint (3) | Powder paint (4) | Powder paint (5) | Powder paint (6) | Powder paint (7) |
| Copolymer (1) | 100 | | | | | 100 | 100 |
| Copolymer (2) | | 90 | | | | | |
| Copolymer (3) | | | 90 | | | | |
| Copolymer (4) | | | | 85 | | | |

Table 2-continued

| | | Example of this invention | | | | | Comparative Examples | |
|---|---|---|---|---|---|---|---|---|
| | | Powder paint (1) | Powder paint (2) | Powder paint (3) | Powder paint (4) | Powder paint (5) | Powder paint (6) | Powder paint (7) |
| Material for melt kneading | Copolymer (5) | | | | | 100 | | |
| | Cymel *1 300 | | 10 | | | | | |
| | Sebacic acid | | | 10 | | | | |
| | Epicoat 1001*2 | | | | 15 | | | |
| | Modaflow *3 | 1 | 1 | 1 | 1 | 1 | 1 | 1 |
| | Phthalocyanine Blue | 1 | 1 | 1 | 1 | 1 | 1 | 1 |
| | Alpaste *4 1109MA | | | | | | 5 | 5 |
| Composite material or metal powder | Composite material (1) | 5 | 5 | | | 5 | | |
| | Composite material (2) | | | 5 | 5 | | | |

Notes for asterisks:
*1 A trade name of a methoxymethylolmelamine resin manufactured by American Cyanamid Co.
*2 A trade name of a diepoxide resin manufactured by Shell Chemicals.
*3 A trade name of an assistant additive manufactured by Monsanto Co.
*4 A trade name of scaly aluminum powder manufactured by Toyo Aluminum K. K.

Table 3

| | Examples of this invention | | | | | Comparitive Examples | |
|---|---|---|---|---|---|---|---|
| Tested items | Powder paint (1) | Powder paint (2) | Powder paint (3) | Powder paint (4) | Powder paint (5) | Powder paint (6) | Powder paint (7) |
| Thickness of the film | 60 μ | 65 μ | 62 μ | 58 μ | 61 μ | 59 μ | 64 μ |
| Brilliancy | Good | Good | Good | Good | Good | Somewhat Good | Poor |
| Luster (ratio of reflection at 60°) | 94 | 90 | 94 | 90 | 90 | 88 | 84 |
| Weather-resistance (ratio of luster retention after illumining for 500 hours by Sunshine weather-O-meter) | 86% | 87% | 85% | 82% | 84% | 65% | 72% |
| Minimum level of concentration causing explosion | 40 mg/l | 50 mg/l | 45 mg/l | 45 mg/l | 40 mg/l | 20 mg/l | 20 mg/l |
| Initial metal content in the powder paint (A) | 4.52% | 4.54% | 4.36% | 4.39% | 4.34% | 4.35% | 4.50% |
| Metal content in the powder paint which was not combined with the panel (B) | 4.58% | 4.70% | 4.39% | 4.48% | 4.30% | 4.80% | 5.81% |
| (B) - (A) | 0.06% | 0.16% | 0.03% | 0.09% | 0.04% | 0.45% | 1.31% |

What is claimed is:

1. A powdery metallic powder-acrylic resin coating composition comprising a mixture of (a) solid powder particles of vinyl copolymer having a glass transition point of at least 20° C and wherein an acrylic ester and a methacrylic ester monomer together constituting at least 30% by weight of the total monomers of said copolymer, and (b) for each about 100 parts by weight of said copolymer particles about 0.1-50 parts by weight of solid particles of a polymer-encapsulated metal powder obtained by activating a metallic powder by treatment with (1) an organic or mineral acid followed by neutralization of the thus-treated powder with an alkali, or (2) an aqueous solution of phosphoric acid; and subjecting the activated metallic powder to an in situ polymerization in an aqueous medium of at least one vinyl monomer in the presence of a radical polymerization initiator, the amount of such vinyl monomer being such as to form about 0.2 - 20 parts by weight of said encapsulating polymer per 100 parts of said metallic powder.

2. A composition according to claim 1 wherein said metal powder is at least one of aluminum, brass, bronze, stainless steel, and copper powders.

3. A composition according to claim 1 wherein the vinyl monomer used for polymer-capsulation of said metal powder is selected from the group consisting of styrene, alphamethylstyrene, vinyltoluene, acrylonitrile, methacrylonitrile, vinyl acetate, vinyl propionate, acrylic acid, methacrylic acid, methyl acrylate, ethyl acrylate, n-butyl acrylate, 2-ethylhexyl acrylate, lauryl acrylate, stearyl acrylate, hydroxyethyl acrylate, a phosphoric ester of hydroxyethyl acrylate, hydroxypropyl acrylate, methoxyethyl acrylate, butoxyethyl acrylate, cyclohexyl acrylate, glycidyl acrylate, methyl methacrylate, ethyl methacrylate, isobutyl methacrylate, n-butyl methacrylate, tert-butyl methacrylate, 2-ethylhexyl methacrylate, lauryl methacrylate, stearyl methacrylate, oleyl methacrylate, methoxyethyl methacrylate, ethoxyethyl methacrylate, butoxyethyl methacrylate, hydroxyethyl methacrylate, a phosphoric ester of hydroxyethyl methacrylate, hydroxypropyl methacrylate, cyclohexyl methacrylate, glycidyl methacrylate, beta-methylglycidyl methacrylate, diethylaminoethyl methacrylate or gamma-methacryloxypropyl(trimethoxy)silane and a combination thereof.

4. A composition according to claim 1 wherein said polymer capsulated metal powder composite material is obtained by capsulation of said metal powder with said polymer of said vinyl monomer, said capsulation being carried out by polymerizing said vinyl monomer in the presence of a radical polymerization initiator which is 2,2'-azo-bis(2-amidinopropane) hydrochloride, tert-butyl permaleate, succinic acid peroxide, a combination of hydrogen peroxide and l-ascorbic acid, cumene hydroperoxide or a combination of a persulfate and bisulfite ion.

5. A composition according to claim 1 wherein said acrylic ester used as a component of said copolymer is methyl acrylate, ethyl acrylate, n-butyl acrylate, isobutyl acrylate, tert-butyl acrylate, 2-ethylhexyl acrylate, cyclohexyl acrylate, methoxyethyl acrylate, ethoxyethyl acrylate, hydroxyethyl acrylate, hydroxyporpyl acrylate or glycidyl acrylate.

6. A composition according to claim 1 wherein said methacrylic ester used as a component of said copolymer is methyl methacrylate, ethyl methacrylate, n-butyl methacrylate, isobutyl methacrylate, tert-butyl methacrylate, 2-ethylhexyl methacrylate, lauryl methacrylate, stearyl methacrylate, methoxyethyl methacrylate, ethoxyethyl methacrylate, butoxyethyl methacrylate, cyclohexyl methacrylate, hydroxyethyl methacrylate, hydroxypropyl methacrylate, tetrahydrofurfuryl methacrylate, glycidyl methacrylate, beta-methylglycidyl methacrylate, dimethylaminoethyl methacrylate, diethylaminoethyl methacrylate or tert-butylaminoethyl methacrylate.

7. The coating composition of claim 1 including about 2 - 15 parts by weight of said polymer encapsulated metallic particles per 100 parts of said copolymer particles.

8. The composition of claim 1 wherein said copolymer particles have an average diameter of about 20-100 micron.

* * * * *